United States Patent [19]

Toyama et al.

[11] Patent Number: 4,682,886
[45] Date of Patent: Jul. 28, 1987

[54] DISTANCE MEASURING DEVICE

[75] Inventors: Masamichi Toyama, Tokyo; Naoya Kaneda; Kazuo Fujibayashi, both of Kanagawa, all of Japan

[73] Assignee: Canon Kabushiki Kaisha, Tokyo, Japan

[21] Appl. No.: 898,864

[22] Filed: Aug. 20, 1986

Related U.S. Application Data

[63] Continuation of Ser. No. 476,241, Mar. 17, 1983.

[30] Foreign Application Priority Data

| Mar. 24, 1982 | [JP] | Japan | 57-46572 |
| Mar. 31, 1982 | [JP] | Japan | 57-53013 |
| Mar. 31, 1982 | [JP] | Japan | 57-53014 |
| Mar. 31, 1982 | [JP] | Japan | 57-53015 |
| Apr. 7, 1982 | [JP] | Japan | 57-57719 |

[51] Int. Cl.$^4$ .......................... G01C 3/00; G03B 3/00
[52] U.S. Cl. ........................................ 356/1; 354/403
[58] Field of Search ............... 356/1, 4, 5; 354/403, 354/404

[56] References Cited

U.S. PATENT DOCUMENTS

| 3,435,744 | 4/1969 | Stimson | 95/44 |
| 3,442,193 | 5/1969 | Pagel . | |
| 4,032,934 | 6/1977 | Hendrickson et al. | 354/25 |
| 4,304,487 | 12/1981 | Odone et al. | 356/1 |
| 4,313,654 | 2/1982 | Matsui et al. | 354/25 |
| 4,330,202 | 5/1982 | Yokota | 356/1 |
| 4,346,988 | 8/1982 | Kimura et al. | 356/1 |
| 4,417,795 | 11/1983 | Tamura et al. | 354/25 |
| 4,441,810 | 4/1984 | Momose et al. | 354/403 X |
| 4,464,038 | 8/1984 | Nanba | 354/403 |
| 4,494,847 | 1/1985 | Yamada | 354/403 |

*Primary Examiner*—Stephen C. Buczinski
*Assistant Examiner*—Linda J. Wallace
*Attorney, Agent, or Firm*—Toren, McGeady & Associates

[57] ABSTRACT

In the disclosed distance measuring device a focal point of an optical system is detected by measuring a distance to an object to be measured with light projecting and receiving means according to the principle of the trigonometric distance measuring method. The device is of the type having light projecting means, light receiving means and the optical axis of the optical system arranged on different planes. Projection of a light flux by the light projecting means is effected within a first plane which contains the optical axis of the optical system and the light projecting means and the reflection of the light from the light flux in projecting means is received within a second plane which contains the optical axis of the optical system and the light receiving means, so that the distance to the object can be always accurately measured on the optical axis of the optical system without any parallax.

53 Claims, 19 Drawing Figures

PRIOR ART
FIG.1(A)
PRIOR ART
FIG.1(B)
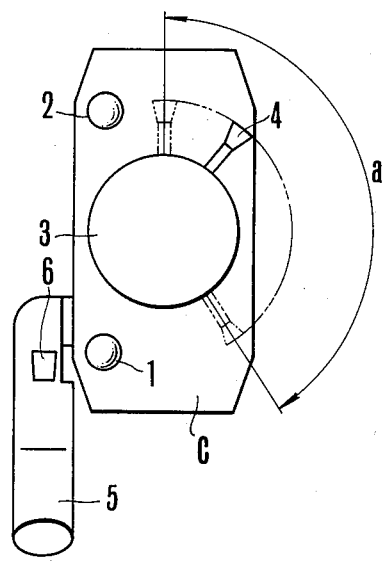
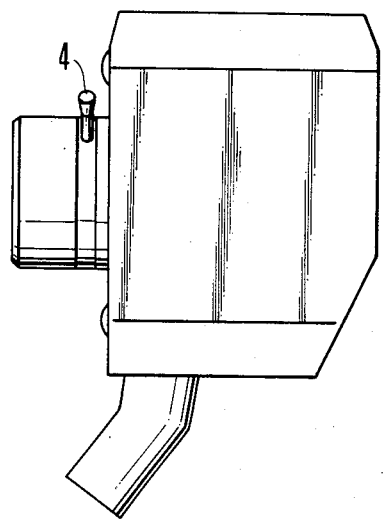
PRIOR ART
FIG.2
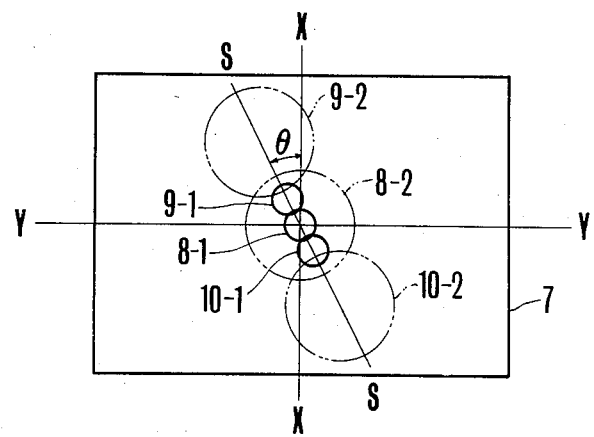

F I G.8
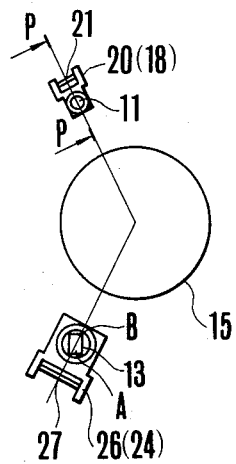
F I G.10(A)    F I G.10(B)
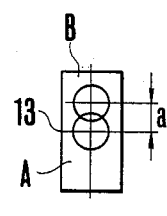   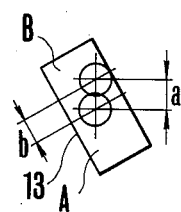
F I G.11
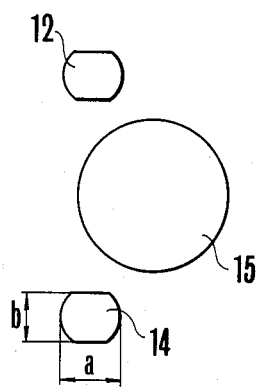

DISTANCE MEASURING DEVICE

This is a continuation of application Ser. No. 476,241, filed Mar. 17, 1983.

BACKGROUND OF THE INVENTION

1. Field of the Invention

This invention relates to a distance measuring device and more particularly to a distance measuring device which is to be used in an automatic focusing device for improving the accuracy of the distance measurement.

2. Description of the Prior Art

Heretofore, many distance measuring devices for automatic focusing arrangement of photographic cameras have been proposed. The majority of them are arranged to operate on the principle of the trigonometric distance measuring method. In a typical example, a light projecting optical system and a light receiving optical system are arranged to have their optical axes spaced as much as a base line length. Light flux projected from a light projecting element included in the light projecting optical system is irregularly reflected as it impinges on an object the distance to which is to be measured. With the light flux thus reflected, an image of the projected light spot on the object is formed on a light receiving or light sensitive element. This imaging position varies with the distance to the object so that information on the distance to the object can be obtained from the imaging position. In the case of a camera, a lens group which performs a focusing action within a photo-taking optical system is interlocked with the aforesaid light sensitive element (and also with the light projecting element) through a cam mechanism or the like in such a way as to permit detection of the distance to an object to be photographed, and thus to permit the automatic focusing of the photo-taking optical system.

However, referring to FIGS. 1(A) and 1(B) of accompanying drawings, an actual camera must be provided with other operational members such as a member for manual zooming, etc. Then, the arrangement of such members compels the light projecting element 1 and the light sensitive element 2 to be arranged in offset positions away from the photo-taking lens 3.

FIGS. 1(A) and 1(B) shown by way of example an 8 mm motion picture camera or a video camera C incorporating therein an automatic focusing device arranged to operate in accordance with the trigonometric distance measuring method. In this case, the camera is provided with a bar 4 for manual zooming. The bar 4 can be turned within a region "a". The operator holds a grip 5, for example, with his right hand to operate a trigger button 6 and performs manual zooming with his left hand. In order to prevent the front parts of the light projecting element 1 and the light sensitive element 2 from being covered by the left hand, the elements 1 and 2 must be arranged away from the center of the phototaking lens 3 as shown in FIG. 1(A). With the camera arranged in this manner, focusing by scanning either with the light projecting element 1 or with the light sensitve element 2, for example, with only the light sensitive element 2, causes the light measurement position to vary within the view finder image plane shown in FIG. 2.

Assuming that when the distance measurement position (or the position of an image of the projected light) is identified by portion 8-1 of the whole image plane 7 as shown in FIG. 2, for a certain distance, the distance measurement position changes to the section of the plane identified by numeral 9-1 if, for example, the object to be photographed is at a very short distance away, and which distance is shorter than a distance corresponding to the section 8-1.

This relation, of course, varies with positional arrangement of the light projecting and receiving (sensitive) elements. Further, the image size of the projected light spot within the image plane changes with the focal length of the photo-taking lens system when the lens is a zoom lens system. In such a case, therefore, the distance measurement position changes to a greater extent as indicated by numerals 8-2, 9-2 and 10-2 in FIG. 2. Under these conditions, when the photographer peers into the view finder, he is unable to see the part to which distance measurement is being applied and thus tends to take a photograph with the lens focused on the wrong object. Therefore, there have been cases where poor photographs have resulted from the use of conventional distance measuring devices. Particularly in the case of a camera having a lens of high magnification such as an 8 mm camera or a video camera, the distance measurement position falls outside of the view finder because of the high magnification of the lens and also the base line length which is long due to the use of a high magnification lens. In such a case, therefore, the object to be photographed moves completely out of focus even if an image of the object is caught within the view finder. This has presented a serious problem.

Summary of the Invention

A first object of the invention is to provide a distance measuring device which is of the type having light projecting means and light receiving means arranged to detect a focal point of an optical system by measuring a distance to an object according to the principle of the trigonometric distance measuring method and having these light projecting and receiving means not on the same plane as the optical axis of the optical system and in which:

Projection of a light flux by the light projecting means is effected within a first plane containing the optical axis of the optical system and the light projecting means while the light receiving means is arranged to receive the reflection within a second plane containing the optical axis of the optical system and the light receiving means, so that the distance to the object can accurately measured on the optical axis of the optical system without any parallax.

A second object of the invention is to improve the distance measuring accuracy of the above device, wherein the light receiving means includes a light sensitive element which is arranged to permit obtaining the output thereof by dividing its outputs into two regions; the outputs thus obtained from two divided regions of the light sensitive element are compared to obtain information on the distance to the distance measuring object; the boundary face of each region of the light sensitive element is arranged to be perpendicular to a straight line connecting the light projecting means to the light receiving means in such a way as to permit comparison of the outputs of the divided regions of the light sensitive element at a high degree of accuracy.

A third object of the invention is to further improve the distance measuring accuracy of the above-stated device, wherein the light projecting means includes a light projecting element and a light projecting optical system for the light projecting element; the above-stated light receiving means includes a light sensitive element and a light receiving optical system for the light sensitive element; the device is provided with means for varying the distance between the light projecting element and the light projecting optical system according to a distance related to the distance measuring object, and means for varying a distance between the light sensitive element and the light receiving optical system according to the distance to the object; and the device is thus arranged such that the image of the projected light spot on the object and the image formed on the surface of the light sensitive element are kept sharp to ensure a high degree of accuracy of distance measurement.

A fourth object of the invention is to further enhance the distance measuring accuracy of the above-stated device, wherein the light receiving optical system for the light sensitive element is a lens of a non-circular shape and has the direction of the shortest length thereof arranged perpendicular to the boundary plane between the above-stated two regions.

These and further objects and features of the invention will become apparent from the following detailed description of preferred embodiments thereof taken in connection with the accompanying drawings.

BRIEF DESCRIPTION OF THE DRAWINGS

FIG. 1(A) is a front view showing by way of example a camera having an automatic focusing device incorporated therein.

FIG. 1(B) is a side view of the same camera.

FIG. 2 is an illustration showing distance measuring positions within the view finder of the camera shown in FIGS. 1(A) and (B).

FIG. 8 is a schematic illustration of light projecting and receiving optical systems of the present invention showing their scanning directions.

FIGS. 10(A) and (B) are front views showing respectively the arrangement of the two regions of the light sensitive element arranged according to the invention.

FIG. 11 is a schematic illustration showing by way of example light projecting and receiving lenses and their positions.

DESCRIPTION OF THE PREFERRED EMBODIMENTS

Figure 3:
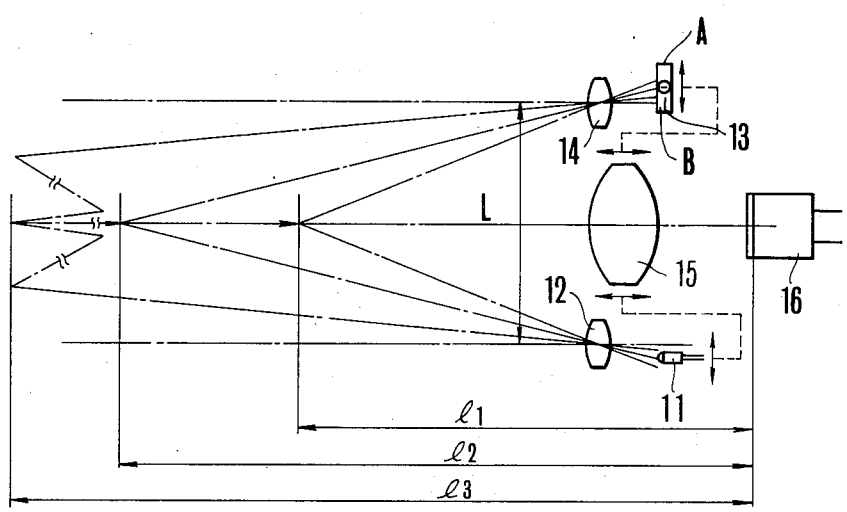
FIG. 3 is an illustration of a distance measuring device according to the present invention.

Referring to FIG. 3 which shows an example of the automatic focusing device embodying the present invention, the automatic focusing device includes a light projecting element 11 which is composed of, for example, an infrared ray emitting diode (IRED) or a laser diode (LD), etc,; and a light projecting lens 12 which serves as a light projecting means. This lens 12 causes the light projecting element 11 to form a projected light spot image on the field side in this example or on the side of a distance measuring object in general cases. Light flux projected from the light projecting element 11 is irregularly reflected when it impinges on the object. Then, a projected light spot image on the surface of the object is formed on a light sensitive element 13 through a light receiving lens 14 which has the same focal length as the above stated light projecting lens 12.

The light sensitive element 13 is a photo diode which is divided, for example, into two light receiving regions and is arranged to permit seeing the output of each of the two regions. This arrangement of the light sensitive element may be replaced with an arrangement of two closely adjacent light sensitive elements.

The image forming position mentioned above changes according as the distance to the object varies as indicated by 11, 12 and 13 in FIG. 3. Therefore, information on the distance to the object can be obtained by detecting the point at which the projected light spot image on the object is formed on the light sensitive element 13.

Assuming that the two regions of the light sensitive element 13 are denominated region A and region B respectively, the position of the light sensitive element 13 is arranged to be varied in such a way as to cause the difference between the outputs of the two regions to become $A-B=0$. Again referring to FIG. 3, a reference numeral 15 indicates a lens group which is included in a photo-taking lens system and is arranged to perform a focusing action; and a numeral 16 indicates an image pickup tube. The light projecting element 11 and the light sensitive element 13 are interlocked with the lens group 15 by means of, for example, a cam mechanism as schematically shown in FIG. 3. This arrangement makes measurement of the distance to the object and automatic focusing possible. Further, continuous focusing on a moving object also becomes possible by arranging the light projecting element to emit the light either continuously or in a pulse-like manner over a short period.

Figure 4:
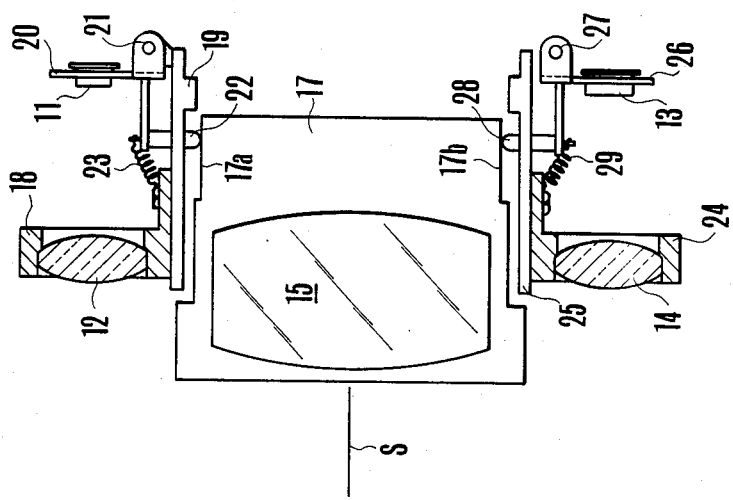
FIGS. 4 and 6 are schematic illustrations respectively showing details of mechanisms of the device shown in FIG. 3.
Figure 5:
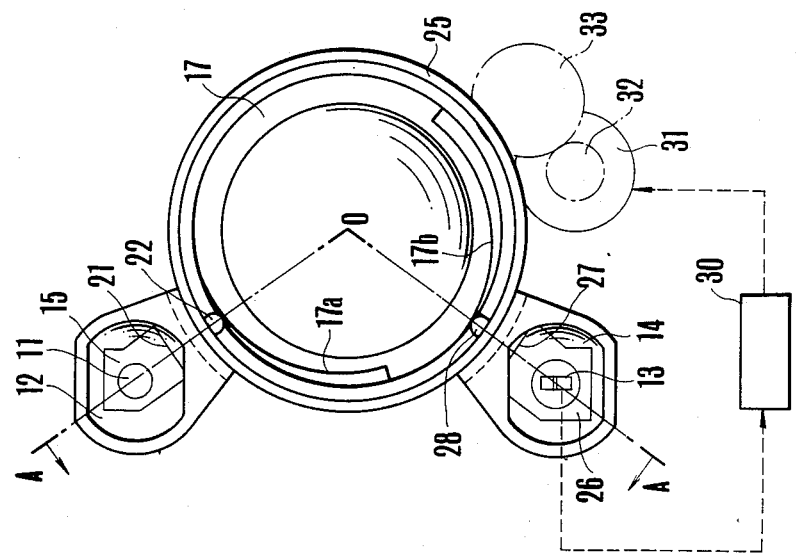
FIGS. 5 and 7 are sectional views of the devices of FIGS. 4 and 6.

The automatic focusing device of FIG. 3 is illustrated in further detail in FIGS. 4 and 5. FIG. 5 is a sectional view of the device of FIG. 4 as taken on line A-0-A of FIG. 4. In FIGS. 4 and 5, the parts arranged in the same manner as those shown in FIG. 3 are indicated by the same reference numerals and are omitted from the following description. The phototaking lens 15 is carried by a lens barrel 17, which is arranged in a known manner to have the position of the photo-taking lens 15 shiftable along its optical axis S by the rotating action of the lens barrel adjustment of the focal point thereof. The light projecting lens 12 is carried by the light projecting lens carrying member 18 which is secured to a structural member 19. Numeral 20 indicates a light projecting element holder which is provided for the purpose of turning the light projecting element 11. The light projecting element holder 20 is pivotally carried by rotating shaft 21 which is arranged on the aforesaid structural member 19 to be perpendicular to a plane containing the light projecting element 11 and the optical axis S. The light projecting element holder 20 is provided with a cam follower 22 which is disposed at one end of the holder 20. A spring 23 is arranged to bring the cam follower 22 into contact with a cam track 17a engraved in the lens barrel 17. When the focal point of the photo-taking lens 15 varies according as the lens barrel 17 rotates, the cam follower 22 causes the light projecting element 11 also to rotate on the rotating shaft 21. With the light projecting element 11 thus rotated or turned, the direction of the light flux projected from the element varies. Since the rotating shaft 21 is arranged to be perpendicular to the plane containing the light projecting element 11 and the optical axis S, the variation of the light flux projecting direction takes place always in such a way as to have the light flux projected from the light projecting element 11 crossing the optical axis and takes place along the optical axis S.

Numeral 24 indicates a light receiving lens carrying member which is arranged to carry the light receiving lens 14 and is secured to a structural member 25. A light receiving element holder 26 is arranged to have the reflected light scanned by the light sensitive element 13. The holder 26 is pivotally carried by a rotating shaft 27 which is arranged on the structural member 25 to be perpendicular to a plane containing the light sensitive element 13 and the optical axis S. The light sensitive element holder 26 is provided with a cam follower 28 which is disposed at one end of the holder 26.

A spring 29 is arranged to bring the cam follower 28 into contact with another cam track 17b engraved in the lens barrel 17. When the lens barrel 17 rotates, the light sensitive element 13 turns on the rotating shaft 27 according as the focal point of the photo-taking lens 15 varies. With the light sensitive element 13 turned in this manner, when the light flux projected from the light projecting element 11 impinges on a distance measuring object on the optical axis S, the reflection resulting from the impingement always intersects the light sensitive element 13. In other words, the direction in which the light flux is projected from the light projecting element 11 and the incident direction of the reflection light flux incident upon the light sensitive element 13 are arranged to always cross each other on the optical axis.

Numeral 30 indicates a computing circuit which detects a focal point from a light receiving signal of the light sensitive element 11 according to the method mentioned above. A motor 31 is driven in accordance with the output of the computing circuit 30. When the motor 31 driven in this manner, the lens barrel 17 is rotated via a gear train 32 and 33 to shift the position of the photo-taking lens 15 to an in-focus position.

Figure 7:
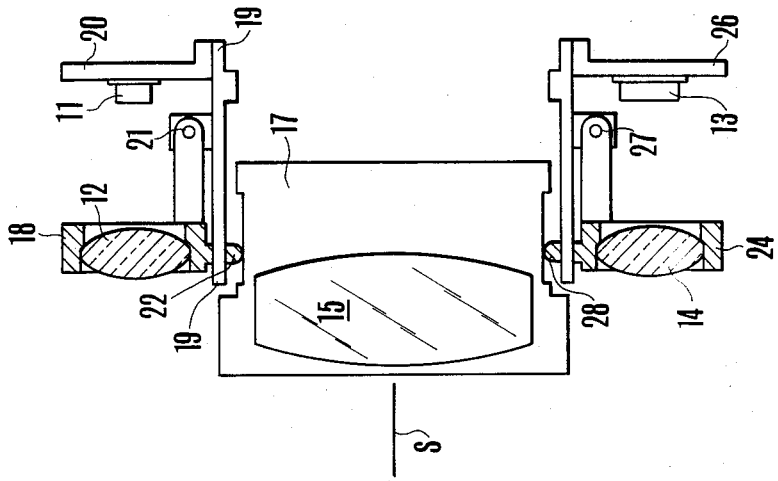
Figure 6:
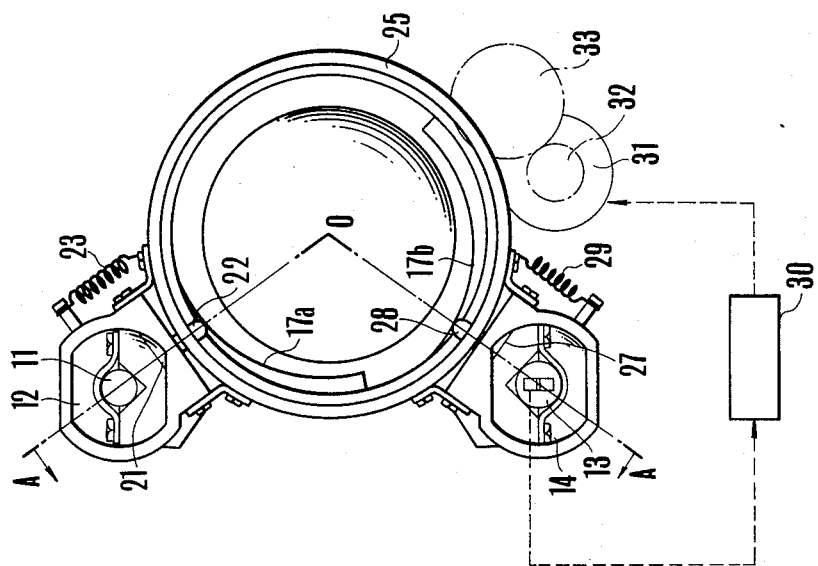

While the device shown in FIG. 4 is arranged to have scanning performed on the optical axis S by turning the light projecting element 11 and the light sensitive element 13, another example of the device which is shown in FIGS. 6 and 7 is arranged to obtain the same effect by turning the light projecting lens 18 and the light receiving lens 24 instead of the light projecting element 11 and the light sensitive element 13. With the exception of this point, the device shown in FIG. 6 is arranged in the same manner as in the device of FIG. 4. Therefore, the same parts are indicated by the same reference numerals as those used in FIGS. 4 and 5 and the description of them is omitted here. Further, FIG. 7 is a sectional view taken on line A-0-A of FIG. 6.

In the arrangement mentioned above, the scanning direction of the light projecting and receiving lens systems are as shown in FIG. 8. Referring now to FIG. 8, the rotating shaft 21 of the light projecting element holder 20 or the light projecting lens carrying member 18 is arranged in a direction which is perpendicular to a plane containing the center of the light projecting element 11 or light projecting lens 12 and the optical axis of the photo-taking lens 15. The object of the invention is attainable as long as the above-stated direction of the rotating shaft 21 is arranged in this manner. The rotating shaft 27 of the light sensitive element holder 26 or the light receiving lens carrying member 24 is likewise arranged in the direction which is perpendicular to a plane containing the center of the light sensitive element 13 or the light receiving lens 14 and the optical axis of the photo-taking lens 15. The light projecting element and the light sensitive element are turned respectively on the rotating shafts 21 and 27 to perform scanning in the direction perpendicular to the paper surface as viewed on FIG. 8. In accordance with this invention, since the scanning directions of the light projecting element and light sensitive element are toward the center of the photo-taking lens, the distance measurement position can be always located in the middle of the view finder image plane even in cases where the optical axis of the photo-taking lens, the light projecting element and the light sensitive element are not on the same plane. In this case, the condition of the image plane of the view finder is as shown in FIG. 9.

Figure 9:
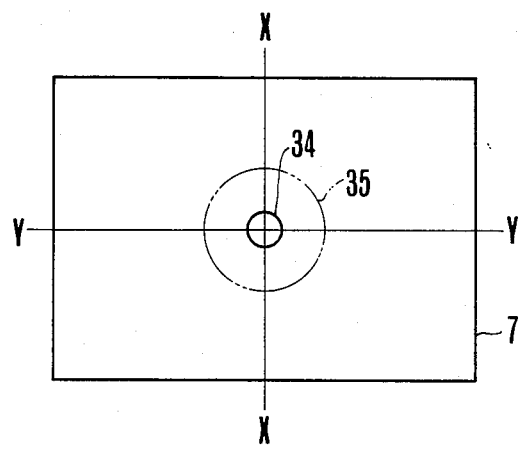
FIG. 9 is an illustration showing the distance measuring position within the view finder of the device according to the invention.

In FIG. 9, the distance measurement position is as shown by a full line when the focal length of the photo-taking lens is short and by a two-dot chain line when the focal length is long. Therefore, so long as the image of an object to be photographed is brought to the middle part of the image plane of the view finder, the focal point can always be adjusted on the object. The distance measuring device according to the invention thus permits extremely accurate automatic focusing.

Further, in the specific embodiment described in the foregoing, the focal lengths of the light projecting and receiving lenses are arranged to be the same. However, where their focal lengths differ from each other, the same advantageous result can be obtained by arranging each of these elements to draw a locus adjusted to its focal length. Both the light projecting and receiving systems of the embodiment are arranged to include imaging lenses as light projecting and receiving lenses. However, the use of these imaging lenses is not absolutely necessary and they may be dispensed with if the light projecting element and the light sensitive element are capable of projecting and receiving sharp spot images respectively.

In the foregoing description, the distance measuring device is of the differential type having the light sensitive element divided into two regions to give information on the distance to the object through the above-stated output (A-B). However, the present invention is not limited to this arrangement but is also applicable to a type using the peak output of the light sensitive element. Besides, the invention is not only applicable to a distance measuring device of the active type to which the embodiment described above belongs, but is also applicable to a passive type distance measuring device.

Each of the light projecting and light sensitive elements may be arranged as a plurality of light projecting or light sensitive elements.

The following description deals with other means that are preferably employed in practicing the invention:

In FIG. 8, reference symbols A and B indicate the aforesaid two regions of the light sensitive element. Generally, including the case where the element has a curved surface, the two regions are arranged to have the boundary between them become a base line, that is, become perpendicular to a straight line connecting the light projecting element and the light sensitive element. In the case of FIG. 8, the light sensitive element has a flat surface. In this case, the aforesaid two regions are arranged to have the direction AB in the direction of connecting the light projecting and light sensitive elements. The reason for this: Assuming that the shifting extent of the projected light spot image at the light sensitive element 13 is "a", a differential output signal can be most accurately taken out by arranging the light spot image to shift in the direction $\overline{AB}$ as shown in FIG. 10(A). Whereas, in the case of arrangement as shown in FIG. 10(B), the shifting extent is detected as "b" (b<a). The latter arrangement is therefore disadvantageous. To accurately obtain the shifting relation as shown in FIG. 10(A), therefore, the light sensitive element 13 must be arranged to have the direction $\overline{AB}$ perpendicular to the direction connecting the light sensitive element and the light projecting element instead of having the direction $\overline{AB}$ in a direction connecting the light sensitive element to the optical axis of the photo-taking lens.

Figure 12A:
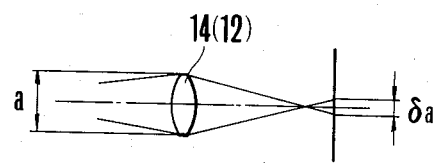
FIGS. 12(A) and (B) are illustrations showing the action of the device of FIG. 11 respectively.
Figure 12B:
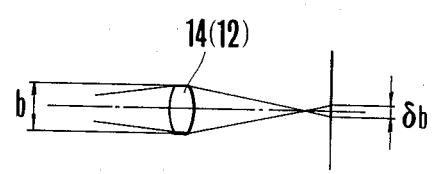

In relation to the aforesaid arrangement of the light sensitive element, it is preferable to have the light projecting and receiving lenses arranged and formed into the shapes as shown in FIG. 11. In order to enhance the accuracy of the A-B differential signal to be taken out from the light sensitive element 13, it is desirable to have the image not excessively blurred and in sharp focus in the direction in which the above-stated regions A and B are aligned. In view of this, in accordance with the invention, the shape and position of the light receiving lens 14 are arranged to be as shown in FIG. 11. More specifically, the shape of the light receiving lens 14 is non-circular with the lateral length "a" thereof arranged to be longer than the vertical "b" and is disposed to have the vertical side "b" in parallel with a line (a base line in this example) connecting the light projecting and light sensitive elements. This is because, as shown in FIGS. 12(A) and (B), light flux coming through the length "a" (in the lateral direction) is blurred over a diameter "δa" while light flux coming through the length "b" (the vertical direction) is blurred over a diameter "δb" within the same distance. Since the expanse of the light spot image must be made smaller and since "δa">δb", the image must be arranged to be sharp with less blurring in the direction of $\overline{AB}$ for a higher degree of accuracy of the A-B signal to be taken out from the light sensitive element 13. This is the reason for the adoption of the arrangement shown in FIG. 11.

The light projecting lens 12 is also arranged for the same reason to be of a shape which is of greater length in the lateral direction "a" than in the vertical direction "b", and is disposed to have the vertical direction "b" thereof in parallel with a line (a base line) connecting the light projecting and light sensitive elements.

In accordance with the invention, the image of the light projecting element on the surface of the object to be photographed, and the image formed on the surface of the light sensitive element, can be kept in a sharp, approximately in-focus state over the whole range from a very near distance to infinity by properly selecting the centers of rotation of the light projecting and light sensitive elements shown in FIG. 8. An essential point of the invention resides in that the distance between the light projecting element and the light projecting lens, and the distance between the light sensitive element and the light receiving lens, are arranged to be variable according to the distance to an object to be photographed.

Figure 13A:
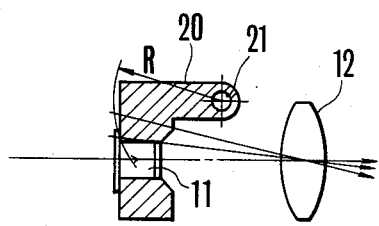
FIGS. 13(A) and (B) are sectional views taken on line P-P showing respectively the light projecting optical system and the light receiving optical system.
Figure 14:
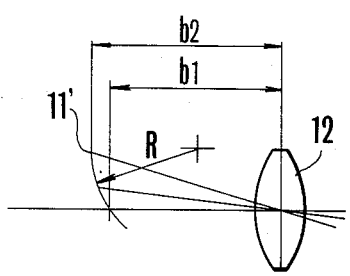
FIG. 14 is an illustration showing the movement of the light projecting element shown in FIG. 13(A).

Further details of the invention will be understood from the following description with reference to FIGS. 13(A) and (B) and 14: FIG. 13(A) is a sectional view taken on line P—P of FIG. 8. As shown here, the rotation shaft 21 of the light projecting element holder 20 is located at a point away from a straight line connecting the light projecting element 11 and the light projecting lens 12. Accordingly, with the above-stated scanning performed, the position of the light projecting element 11 is shifted along the periphery of a circle having a radius R on the rotation shaft 21 of the light projecting element 11. Then, as shown in FIG. 14, the distance from the light projecting lens 12 to the element 11 becomes "b1" when the object to be photographed is located at infinity and becomes b2 when the object is located at a very short distance away. The distance "b2" is longer than the distance "b1". Therefore, with the position of the rotation shaft suitably selected, the image of the projected light spot on the object can be kept sharp covering the whole range from the very near distance to infinity. In determining the position of the rotation shaft 21, it is essential to arrange to have the distance between the light projecting lens and the light projecting element vary as linearly as possible between the aforementioned distances "b2" and "b1" when the position of the light projecting element is shifted. The distance "b1" is determined by the focal length of the lens and, where the invention is applied to a photo-taking apparatus, the distance "b2" is substanttially determined by the shortest distance of the photo-taking lens. Therefore, again referring to FIG. 14, an angle to be defined by a line connecting a point 11' to the center of the light projecting lens 12 and the optical axis of the light projecting lens 12 can be determined accordingly. The radius R and the position of the rotation shaft 21 can then be suitably selected.

The accuracy of the distance measurement increases according as the image of the projected light spot is smaller and sharper, because with the image being smaller, the probability of having a plurality of objects located at different distances within the projected light spot decreases; the probability of having a plurality of objects of different reflection factors also decreases; and the detecting capability of the light sensitive element can be increased.

Figure 13B:
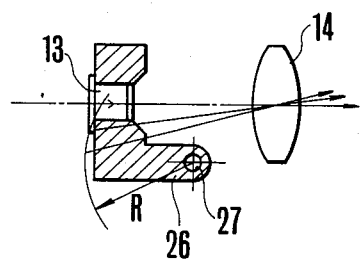

Referring now to FIG. 13(B), the light sensitive element 13 is also arranged in the same manner as the element 11. The light sensitive element 13 is arranged to have its position shifted along the periphery of a circle of radius R on the rotation shaft 27. The distance between the light receiving lens 14 and the element 13 is arranged to be variable with the distance to the object to be photographed. The arrangement of the light sensitive element 13 thus results in a sharp image of the projected light spot formed on the surface of the light sensitive element.

As has been described above, both the images of the projected light spot formed on the object to be photographed and formed on the surface of the light sensitive element can be sharpened by the arrangement shown in FIGS. 13(A) and (B).

Figure 15:
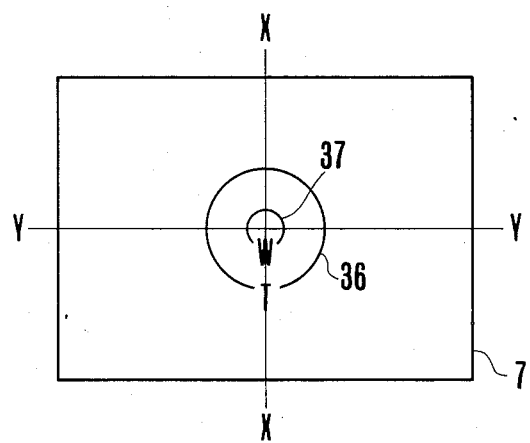
FIG. 15 is an illustration showing a visual field display of distance measurement to be made within a view finder according to the invention.

With the present invention applied, visual field mark arrangements within a view finder can be simplified in such a manner as shown in FIG. 15. In other words, the visual field information on distance measurement can be obtained with sufficient accuracy by simply providing a mark 36 for the longest focal length of the photo-taking lens and another mark 37 for the shortest focal length of the lens.

Further, in case of a photo-taking lens system which is interchangeable with another lens system, the above-stated mark 36 can be used for a lens system of long focal length and the mark 37 for a lens system of short focal length for obtaining the same advantageous effect of the invention.

Such being the arrangement and operation of the invention, the adverse effect of parallax of three optical systems can be eliminated in accordance with the invention even where the optical axis of a main optical system and those of the light projecting means and light receiving means provided for the purpose of distance measurement are not located on the same plane. The invention enhances the accuracy of distance measurement and permits maximum reduction in size of an apparatus incorporating the distance measuring device therein according to the invention. The advantageous effects attainable in accordance with the invention are therefore extremely great.

What we claim:

1. A distance measuring device for measuring a distance to an object, comprising:
    an imaging optical system for forming an image of said object at a predetermined position;
    light projecting means for projecting light toward said object within a first plane containing the optical axis of said imaging optical system and said light projecting means; and
    light receiving means for receiving light reflected from said object within a second plane containing the optical axis of said imaging optical system and said light receiving means,
    said first plane and said second plane being non-coplanar: and
    a computing circuit responsive to said light receiving means to produce a signal related to the distance.

2. A device according to claim 1, wherein said light projecting means includes a light projecting element the position of which is variable.

3. A device according to claim 1, wherein said light projecting means includes displacing means for shifting a point at which the light is projected.

4. A device according to claim 3, wherein said displacing means includes a light projecting element the position of which is shiftable.

5. A device according to claim 3, wherein said displacing means includes a light projecting optical system the position of which is variable.

6. A device according to claim 1, wherein said light receiving means includes a scanning part which is capable of receiving light fluxes coming from different directions.

7. A device according to claim 6, wherein said scanning part includes a light sensitive element the position of which is variable.

8. A device according to claim 6, wherein said scanning part includes a plurality of light sensitive elements.

9. A device according to claim 6, wherein said scanning part includes a light receiving optical system the position of which is variable.

10. A device according to claim 1 wherein said light receiving means includes a light receiving part having a plurality of light receiving regions and is arranged to detect a distance to said object through comparison of the outputs of said light receiving regions; and the boundary between said regions of the light receiving part is arranged to be perpendicular to a base line.

11. A device according to claim 10, wherein said light receiving means further includes a light receiving optical system for said light receiving part; said light receiving optical system includes a lens of an approximately elliptical shape formed by cutting away two parts of a circular lens symmetrically relative to the central line thereof; and the longitudinal direction of said elliptical lens is arranged to be perpendicular to the boundary of the regions of said light receiving part.

12. A device according to claim 11, wherein said light projecting means includes:
    a light projecting part arranged to generate a light flux; and
    a light projecting optical system for said light projecting part, said light projecting optical system including a lens of an approximately elliptical shaped formed by cutting away two parts of a circular lens symmetrically relative to the central line thereof, the longitudinal direction of said elliptical lens being arranged transverse to a base line.

13. A device according to claim 12, wherein said light receiving part is divided into two regions; and a distance to the object which is to be measured is detected from a difference between the outputs of said two divided regions.

14. A device according to claim 1, wherein said light projecting means includes:
    a light projecting part for producing light flux;
    a light projecting optical system arranged in combination with said light projecting part; and
    light projecting distance varying means for varying a distance between said light projecting part and said light projecting optical system according to a distance to an object to be measured.

15. A device according to claim 1 or 14, wherein said light receiving means includes:
    a light receiving part arranged to receive a light flux;
    a light receiving optical system arranged in combination with said light receiving part; and light receiving distance varying means for varying a distance between said light receiving part and said light receiving optical system according to the distance to the object to be measured.

16. A device according to claim 1 further including a view finder which is arranged to permit visual confirmation of the object the distance to which is to be measured, said view finder having the following two display means in the middle part thereof:
    (a) first display means which is arranged to be used when the focal length of said imaging optical system is long; and
    (b) second display means which is arranged to be used when the focal length of said imaging optical system is short.

17. A device as in claim 1, wherein said light projecting means includes means for projecting the light along a first path within the first plane, and said light receiving means includes means for receiving reflected light along a second path within the second plane.

18. A distance measuring device for measuring a distance to an object, comprising:
   an imaging optical system for forming an image of said object at a predetermined position;
   light projecting means for scanningly projecting light toward said object within a first plane containing an optical axis of said imaging optical system and said light projecting means;
   light receiving means for receiving light reflected from said object, said light receiving means and the optical axis of said imaging optical system forming a second plane; and
   a computing circuit responsive to said light receiving means to produce a signal related to the distance, said first plane and said second plane being non-coplanar.

19. A device according to claim 18, wherein said light projecting means includes displacing means for shifting a point at which the light is projected.

20. A device according to claim 19, wherein said displacing means includes a light projecting element, the position of which is shiftable.

21. A device according to claim 19, wherein said displacing means includes a light projecting optical system, the position of which is variable.

22. A device according to claim 18, wherein said light receiving means includes a scanning part which is capable of receiving light fluxes coming from different directions.

23. A device according to claim 22, wherein said scanning part includes a light sensitive element, the position of which is variable.

24. A device according to claim 22, wherein said scanning part includes a plurality of light sensitive elements.

25. A device according to claim 22, wherein said scanning part includes a light receiving optical system, the position of which is variable.

26. A device according to claim 18, wherein said light receiving means includes a light receiving part having a plurality of light receiving regions and is arranged to detect a distance to said object through comparison of the outputs of said light receiving regions; and the boundary between said regions of the light receiving part is arranged to be perpendicular to a base line.

27. A device according to claim 26, wherein said light receiving means further includes a light receiving optical system for said light receiving part; said light receiving optical system includes a lens of an approximately elliptical shape formed by cutting away two parts of a circular lens symmetrically relative to the central line thereof; and the longitudinal direction of said elliptical lens is arranged to be perpendicular to the boundary of the regions of said light receiving part.

28. A device according to claim 27, wherein said light projecting means includes:
   a light projecting part arranged to generate a light flux; and
   a light projecting optical system for said light projecting part, said light projecting optical system including a lens of an approximately elliptical shape formed by cutting away two parts of a circular lens symmetrically relative to the central line thereof, the longitudinal direction of said elliptical lens being arranged transverse to a base line.

29. A device according to claim 28, wherein said light receiving part is divided into two regions; and a distance to the object which is to be measured is detected from a difference between the outputs of said two divided regions.

30. A distance measuring device for measuring a distance to an object, comprising:
   an imaging optical system for forming an image of said object at a predetermined position;
   light projecting means for projecting light toward said object, said light projecting means and optical axis of said imaging optical system forming a first plane;
   light receiving means for scanningly receiving light reflected from said object within a second plane containing the optical axis of said imaging optical system and said light receiving means; and
   a computing circuit responsive to said light receiving means to produce a signal related to the distance, said first plane and said second plane being non-coplanar.

31. A device according to claim 30, wherein said light projecting means includes displacing means for shifting a point at which the light is projected.

32. A device according to claim 31, wherein said displacing means includes a light projecting element, the position of which is shiftable.

33. A device according to claim 31, wherein said displacing means includes a light projecting optical system, the position of which is variable.

34. A device according to claim 30, wherein said light receiving means includes a scanning part which is capable of receiving light fluxes coming from different directions.

35. A device according to claim 34, wherein said scanning part includes a light sensitive element, the position of which is variable.

36. A device according to claim 34, wherein said scanning part includes a plurality of light sensitive elements.

37. A device according to claim 34, wherein said scanning part includes a light receiving optical system, the position of which is variable.

38. A device according to claim 30, wherein said light receiving means includes a light receiving part having a plurality of light receiving regions and is arranged to detect a distance to said object through comparison of the outputs of said light receiving regions; and the boundary between said regions of the light receiving part is arranged to be perpendicular to a base line.

39. A device according to claim 38, wherein said light receiving means further includes a light receiving optical system for said light receiving part; said light receiving optical system includes a lens of an approximately elliptical shape formed by cutting away two parts of a circular lens symmetrically relative to the central line thereof; and the longitudinal direction of said elliptical lens is arranged to be perpendicular to the boundary of the regions of said light receiving part.

40. A device according to claim 39, wherein said light projecting means includes:
   a light projecting part arranged to generate a light flux; and
   a light projecting optical system for said light projecting part, said light projecting optical system including a lens of an approximately elliptical shape formed by cutting away two parts of a circular lens symmetrically relative to the central line thereof, the longitudinal direction of said elliptical lens being arranged transverse to a base line.

41. A device according to claim 40, wherein said light receiving part is divided into two regions; and a distance to the object which is to be measured is detected from a difference between the outputs of said two divided regions.

42. A distance measuring device for measuring a distance to an object, comprising:
an imaging optical system for forming an image of said object at a predetermined position;
light projecting means for scanningly projecting light toward said object within a first plane containing an optical axis of said imaging optical system and said light projecting means;
light receiving means for scanningly receiving light reflected from said object within a second plane containing the optical axis of said imaging optical system and said light receiving means;
association means for associating the scanning of the projection light by said light projecting means with the scanning in the receiving direction by said light receiving means; and
a computing circuit responsive to said light receiving means to produce a signal related to the distance, said first plane and said second plane being non-coplanar.

43. A device according to claim 42, wherein said light projecting means includes displacing means for shifting a point at which the light is projected.

44. A device according to claim 43, wherein said displacing means includes a light projecting element, the position of which is shiftable.

45. A device according to claim 43, wherein said displacing means includes a light projecting optical system, the position of which is variable.

46. A device according to claim 42, wherein said light receiving means includes a scanning part which is capable of receiving light fluxes coming from different directions.

47. A device according to claim 46, wherein said scanning part includes a light sensitive element, the position of which is variable.

48. A device according to claim 46, wherein said scanning part includes a plurality of light sensitive elements.

49. A device according to claim 46, wherein said scanning part includes a light receiving optical system, the position of which is variable.

50. A device according to claim 42, wherein said light receiving means includes a light receiving part having a plurality of light receiving regions and is arranged to detect a distance to said object through comparison of the outputs of said light receiving regions; and the boundary between said regions of the light receiving part is arranged to be perpendicular to a base line.

51. A device according to claim 50, wherein said light receiving means further includes a light receiving optical system for said light receiving part; said light receiving optical system includes a lens of an approximately elliptical shape formed by cutting away two parts of a circular lens symmetrically relative to the central line thereof; and the longitudinal direction of said elliptical lens is arranged to be perpendicular to the boundary of the regions of said light receiving part.

52. A device according to claim 51, wherein said light projecting means includes:
a light projecting part arranged to generate a light flux; and
a light projecting optical system for said light projecting part, said light projecting optical system including a lens of an approximately elliptical shape formed by cutting away two parts of a circular lens symmetrically relative to the central line thereof, the longitudinal direction of said elliptical lens being arranged transverse to a base line.

53. A device according to claim 52, wherein said light receiving part is divided into two regions; and a distance to the object which is to be measured is detected from a difference between the outputs of said two divided regions.

* * * * *